(12) United States Patent
Fang

(10) Patent No.: US 9,995,913 B1
(45) Date of Patent: Jun. 12, 2018

(54) OPTICAL CAMERA LENS

(71) Applicant: Chunhuan Fang, Shenzhen (CN)

(72) Inventor: Chunhuan Fang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 11 days.

(21) Appl. No.: 15/416,578

(22) Filed: Jan. 26, 2017

(30) Foreign Application Priority Data

Dec. 14, 2016 (CN) .......................... 2016 1 1156273

(51) Int. Cl.
*G02B 3/02* (2006.01)
*G02B 13/18* (2006.01)
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ... G02B 13/0045; G02B 9/62; G02B 27/0025
USPC ........................................ 359/713, 757, 708
See application file for complete search history.

(56) References Cited

U.S. PATENT DOCUMENTS

| 2015/0277085 A1* | 10/2015 | Noda | G02B 9/62 359/713 |
| 2015/0362702 A1* | 12/2015 | Tang | G02B 13/0045 348/335 |
| 2016/0103300 A1* | 4/2016 | Tang | G02B 27/0025 348/335 |
| 2016/0161721 A1* | 6/2016 | Chen | G02B 13/0045 359/713 |

* cited by examiner

*Primary Examiner* — Collin X Beatty
(74) *Attorney, Agent, or Firm* — Na Xu; IPro, PLLC

(57) ABSTRACT

The present disclosure relates to field of optical lens, and discloses an optical camera lens, which, from the object side to the image side, successively includes: an aperture, first, second, third, fourth, fifth, sixth lenses; a curvature radius of an object-side surface of the second lens r3, a curvature radius of an image-side surface of the fourth lens r8, a total track length of the optical camera lens TTL, an image height IH, a curvature radius of an object-side surface of the fifth lens r9, a curvature radius of an image-side surface r10, a focal length of the integral optical camera lens f, focal lengths of the second, third, fourth lens f2, f3, f4 satisfy the relational expressions: $-0.7<r3/r8<-0.5$; $TTL/IH<1.35$; $1.24<(r9-r10)/(r9+r10)<1.4$; $1.5<|(f2+f4)/f3|<2.4$; $-3.5<f2/f<-2.5$. The optical camera lens provided by the present disclosure can achieve low TTL, and meanwhile having the advantages of large aperture and low sensitivity.

4 Claims, 8 Drawing Sheets

OPTICAL CAMERA LENS

TECHNICAL FIELD

The present disclosure relates to the field of optical lens and, particularly, relates to an optical camera lens adapted for portable terminal devices such as smart cellphone, digital camera etc. and for camera devices such as monitor, PC lens etc.

BACKGROUND

In recent years, as the booming development of the smart cellphone, the need on miniaturized camera lens is increasing gradually. However, the photosensitive component of a conventional camera lens is either a charge coupled device (Charge Coupled Device, CCD) or a complementary metallic-oxide semiconductor sensor (Complementary Metal-Oxide Semiconductor Sensor, CMOS Sensor). With the development of semiconductor processing technique, pixel size of the photosensitive component is reduced. In addition, the electronic product at present is developed to have better functions and a lighter and thinner configuration. Therefore, a miniaturized camera lens with better imaging quality has already become the mainstream in the current market.

In order to obtain better imaging quality, a traditional lens carried in a cellphone camera usually adopts a three-lens or four-lens structure. As the development of technologies and increasing of user's diversified needs, in the situation of the pixel area of the photosensitive component being reduced, and the requirements of the system on imaging quality being increased constantly, a six-lens structure appears in the lens design gradually. However, although the common six-lens structure can correct most optical aberration of an optical system, but cannot meet the requirements of camera design on low total track length (Total Track Length, TTL), large aperture and low sensitivity at the same time.

BRIEF DESCRIPTION OF DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to make objectives, technical solutions and advantages of the present disclosure more clearly, embodiments of the present disclosure will be illustrated in detail with reference to the accompanying drawings. Those skilled in the art should understand, in each implementing manner of the present disclosure, in order to make the reader understand the present disclosure, a plurality of technical details have been proposed. However, the technical solutions protected by the present disclosure shall also be implemented without these technical details and the various modifications and variations presented in the embodiments.

Figure 1:
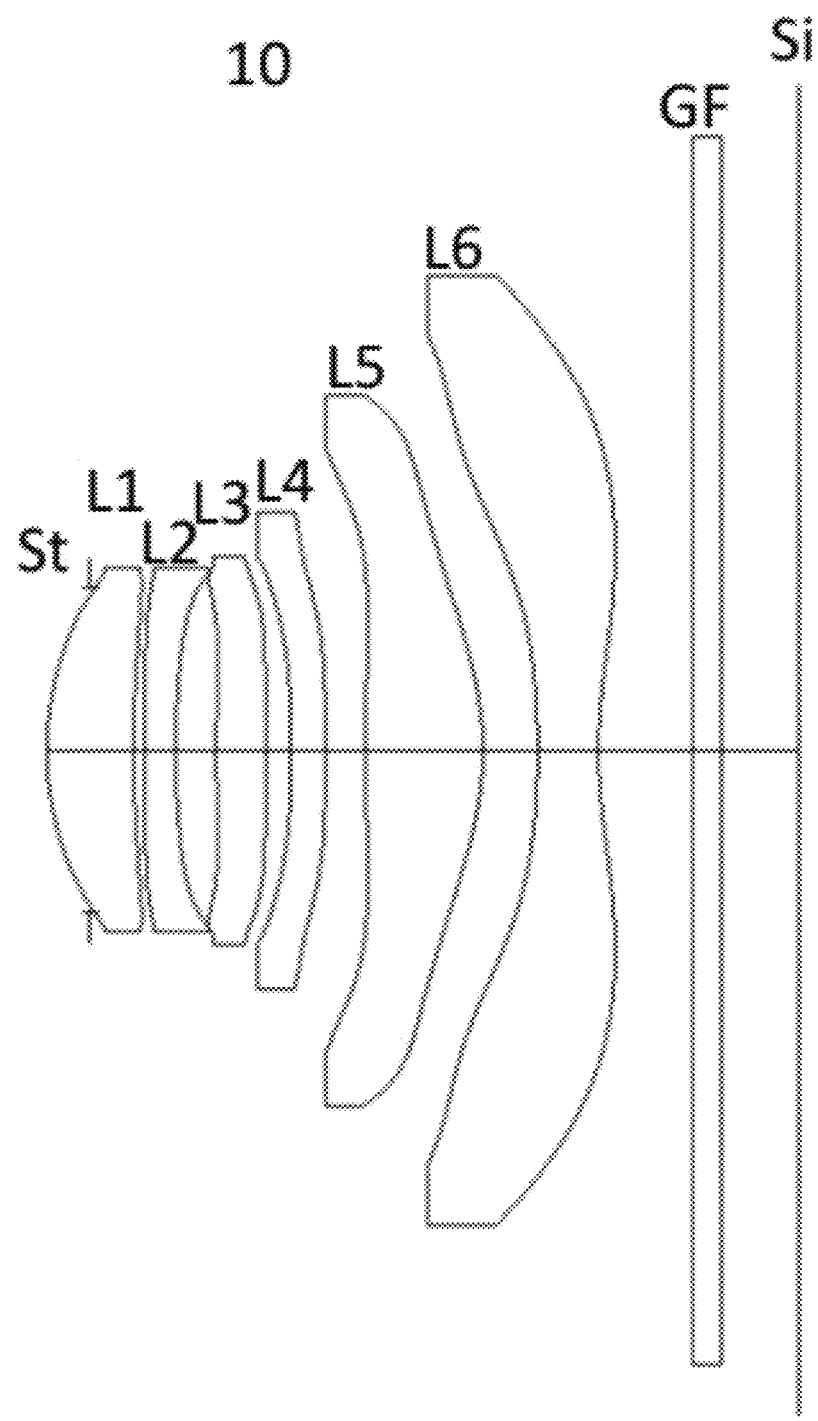
FIG. 1 is a structural schematic diagram of an optical camera lens according to an exemplary embodiment of the present disclosure.

Referring to the figures, the present disclosure provides an optical camera lens. FIG. 1 shows an optical camera lens 10 according to an exemplary embodiment of the present disclosure, the optical camera lens 10 includes six lenses. Specifically, the optical camera lens 10, from an object side to an image side, successively includes: an aperture St, a first lens L1, a second lens L2, a third lens L3, a fourth lens L4, a fifth lens L5, and a sixth lens L6. An optical component such as an optical filter GF can be arranged between the sixth lens L6 and an imaging surface Si.

The first lens L1 has positive refraction power, an object-side surface thereof bulges outward to be a convex surface, the aperture St is arranged between the object and the first lens L1. The first lens L1 having positive refraction power provides partial refraction power required by the optical imaging system, which can facilitate reduction of the total track length of the optical camera lens 10. The second lens L2 has negative refraction power, in the present embodiment, an image-side surface of the second lens L2 is a concave surface. The third lens L3 has positive refraction power, in the present embodiment, an object-side surface of the third lens L3 is a concave surface. The fourth lens L4 has negative refraction power, in the present embodiment, an object-side surface of the fourth lens L4 is a concave surface, an image-side surface thereof is a convex surface. The fifth lens L5 has positive refraction power, in the present embodiment, an image-side surface of the fifth lens L5 is a convex surface. The sixth lens L6 has negative refraction power, in the present embodiment, an object-side surface of the sixth lens L6 is a concave surface.

Herein, it is defined that a curvature radius of the object-side surface of the second lens is r3, a curvature radius of the image-side surface of the fourth lens is r8, a total track length of the optical camera lens is TTL, an image height of the optical camera lens is IH, a curvature radius of the object-side surface of the fifth lens is r9, a curvature radius of the image-side surface of the fifth lens is r10, a focal length of the integral optical camera lens is f, a focal length of the second lens is f2, a focal length of the third lens is f3, a focal length of the fourth lens is f4. The r3, r8, TTL, IH, r9, r10, f, f2, f3 and f4 satisfy the following relational expressions: $-0.7 < r3/r8 < -0.5$; $TTL/IH < 1.35$; $1.24 < (r9-r10)/r9+r10) < 1.4$; $1.5 < |(f2+f4)/f3| < 2.4$; $-3.5 < f2/f < -2.5$.

The relation between the total track length and the image height is set to be $TTL/IH < 1.35$, which can achieve wide angle of the camera lens, and effectively reduce the total track length of the system. The third lens having positive refraction power, the fourth lens having negative refraction power can be distribute the positive refraction power of the first lens, so as to reduce sensitivity of the system. Besides, the refraction power/focal power of the sixth lens adopt the design solution of positive-negative-positive-negative-positive-negative, and the focal lengths of the second, third and fourth lens satisfy the relational expressions of $1.5 < |(f2+f4)/f3| < 2.4$; $-3.5 < f2/f < -2.5$, which can uniformly distribute the focal power, so as to reduce sensitivity of the system. Besides, the design relation of the curvature radius is:

−0.7<r3/r8<−0.5, 1.24<(r9−r10)/(r9+r10)<1.4, which can effectively correct system spherical aberration, so as to guarantee imaging quality.

When the optical parameters of the optical camera lens 10 satisfies the above relational expressions, the refraction power configuration of each lens can be controlled/adjusted, which can correct aberration by using the lenses having different refraction power and focal lengths so as to guarantee imaging quality and, at the same time, can reduce the total track length of the system so as to obtain low TTL, and can reduce sensitivity of the integral camera lens, and have the advantage of large aperture at the same time.

Specifically, in an embodiment of the present disclosure, the focal length f1 of the first lens, the focal length f2 of the second lens, the focal length f3 of the third lens, the focal length f4 of the fourth lens, the focal length f5 of the fifth lens and the focal length f6 of the sixth lens can be designed so as to satisfy the following relational expressions: 4<f1<5; −15<f2<−10; 10<f3<20; −18<f4<−12; −4<f5<−2; −3<f6<−2, unit: millimeter (mm). Such a design can shorten the total track length (TLL) of the integral optical camera lens 10 as much as possible, so as to maintain the characteristics of miniaturization.

In the optical camera lens 10 of the present disclosure, each lens can be made of glass or plastic, if the lens is made of glass, which can increase the freedom of the refraction power configuration of the optical system of the present disclosure, if the lens is made of plastic, which can reduce production cost effectively.

In an embodiment of the present disclosure, all lenses are plastic lenses. Further, in an embodiment of the present disclosure, a refractive index n1 of the first lens, a refractive index n2 of the second lens, a refractive index n3 of the third lens, a refractive index n4 of the fourth lens, a refractive index n5 of the fifth lens and a refractive index n6 of the sixth lens can be designed to satisfy the following relational expressions: 1.50<n1<1.55; 1.60<n2<1.70; 1.50<n3<1.55; 1.60<n4<1.70; 1.50<n5<1.55; 1.50<n6<1.55. Such a design is advantageous for an appropriate matching of the lenses with optical plastic material, so that the optical camera lens 10 can obtain better imaging quality.

It should be noted that, in an embodiment of the present disclosure, an abbe number v1 of the first lens, an abbe number v2 of the second lens, an abbe number v3 of the third lens, an abbe number v4 of the fourth lens, an abbe number v5 of the fifth lens and an abbe number v6 of the sixth lens can be designed to satisfy the following relational expressions: 40<v1<60; 15<v2<30; 40<v3<60; 15<v4<30; 40<v5<60; 40<v6<60. Such a design can suppress the phenomenon of optical chromatic aberration during imaging by the optical camera lens 10.

Besides, the surface of the lens can be an aspheric surface, the aspheric surface can be easily made into shapes other than spherical surface, so as to obtain more controlling varieties, which are used to eliminate aberration so as to reduce the number of the lens used, thereby can effectively reduce the total track length of the optical camera lens of the present disclosure. In an embodiment of the present disclosure, the object-side surface and the image-side surface of each lens are all aspheric surfaces.

Optionally, an inflection point and/or a stationary point can be provided on the object-side surface and/or the image-side surface of the lens, so as to satisfy the imaging needs on high quality, the specific implementing solution is as follows.

The design data of the optical camera lens 10 according to Embodiment 1 of the present disclosure is shown as follows.

Table 1 and Table 2 show data of the lens in the optical camera lens 10 according to an exemplary embodiment of the present disclosure.

TABLE 1

| Focal length (mm) | |
|---|---|
| f | 4.234589 |
| f1 | 4.541782 |
| f2 | −12.8574 |
| f3 | 18.61419 |
| f4 | −15.4287 |
| f5 | 2.849814 |
| f6 | −2.9918 |
| f12 | 6.342244 | in which, meaning of each symbol is as follows.
f: focal length of the optical camera lens 10;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
f12: combined focal length of the first lens L1 and the second lens L2.

TABLE 2

| | | Curvature radius (R) (mm) | Thickness/ Distance (d) (mm) | Sagittal height (SAG) (mm) | | Semi-diameter (SD) (mm) | Refractive index (nd) | | Abbe number (vd) | |
|---|---|---|---|---|---|---|---|---|---|---|
| St | St | ∞ | d0 = −0.305 | | | | | | | |
| L1 | R1 | 1.77281 | d1 = 0.612 | SAG11 | 0.417 | 1.147 | nd1 | 1.5449 | v1 | 55.93 |
| | R2 | 5.48830 | d2 = 0.075 | SAG12 | 0.045 | 1.162 | | | | |
| L2 | R3 | 8.91773 | d3 = 0.222 | SAG21 | 0.073 | 1.160 | nd2 | 1.6510 | v2 | 21.51 |
| | R4 | 4.27513 | d4 = 0.290 | SAG22 | 0.242 | 1.132 | | | | |
| L3 | R5 | 8.11868 | d5 = 0.347 | SAG31 | −0.027 | 1.167 | nd3 | 1.5449 | v3 | 55.93 |
| | R6 | 40.06164 | d6 = 0.187 | SAG32 | −0.147 | 1.240 | | | | |
| L4 | R7 | −6.33307 | d7 = 0.241 | SAG41 | −0.241 | 1.262 | nd4 | 1.6510 | v4 | 21.51 |
| | R8 | −17.40000 | d8 = 0.287 | SAG42 | −0.224 | 1.518 | | | | |
| L5 | R9 | 15.68747 | d9 = 0.828 | SAG51 | −0.288 | 1.933 | nd5 | 1.5449 | v5 | 55.93 |
| | R10 | −1.69146 | d10 = 0.386 | SAG52 | −0.845 | 2.264 | | | | |
| L6 | R11 | −5.290793 | d11 = 0.431 | SAG61 | −0.778 | 2.644 | nd6 | 1.5449 | v6 | 55.93 |
| | R12 | 2.424078 | d12 = 0.664 | SAG62 | −0.723 | 3.020 | | | | |
| GF | R13 | ∞ | d13 = 0.210 | | | | ndg | 1.5168 | vg | 64.17 |
| | R14 | ∞ | d14 = 0.552 | | | | | | | |

In which, R1, R2 are the object-side surface and the image-side surface of the first lens L1, respectively; R3, R4 are the object-side surface and the image-side surface of the second lens L2, respectively; R5, R6 are the object-side surface and the image-side surface of the third lens L3, respectively; R7, R8 are the object-side surface and the image-side surface of the fourth lens L4, respectively; R9, R10 are the object-side surface and the image-side surface of the fifth lens L5, respectively; R11, R12 are the object-side surface and the image-side surface of the sixth lens L6, respectively; R13, R14 are the object-side surface and the image-side surface of the optical filter GF, respectively. Meanings of other symbols are as follows.

d0: axial distance from the aperture St to the object-side surface of the first lens L1;

d1: axial thickness of the first lens L1;

d2: axial distance from the image-side surface of the first lens L1 to the object-side surface of the second lens L2;

d3: axial thickness of the second lens L2;

d4: axial distance from the image-side surface of the second lens L2 to the object-side surface of the third lens L3;

d5: axial thickness of the third lens L3;

d6: axial distance from the image-side surface of the third lens L3 to the object-side surface of the fourth lens L4;

d7: axial thickness of the fourth lens L4;

d8: axial distance from the image-side surface of the fourth lens L4 to the object-side surface of the fifth lens L5;

d9: axial thickness of the fifth lens L5;

d10: axial distance from the image-side surface of the fifth lens L5 to the object-side surface of the sixth lens L6;

d11: axial thickness of the sixth lens L6;

d12: axial distance from the image-side surface of the sixth lens L6 to the object-side surface of the optical filter GF;

d13: axial thickness of the optical filter GF;

d14: axial distance from the image-side surface of the optical filter GF to the imaging surface;

SAG: sagittal height, vertical distance between topmost point and bottommost point of the lens;

SAG11: sagittal height of the surface R1 of the first lens L1;

SAG12: sagittal height of the surface R2 of the first lens L1;

SAG21: sagittal height of the surface R3 of the second lens L2;

SAG22: sagittal height of the surface R4 of the second lens L2;

SAG31: sagittal height of the surface R5 of the third lens L3;

SAG32: sagittal height of the surface R6 of the third lens L3;

SAG41: sagittal height of the surface R7 of the fourth lens L4;

SAG42: sagittal height of the surface R8 of the fourth lens L4;

SAG51: sagittal height of the surface R9 of the fifth lens L5;

SAG52: sagittal height of the surface R10 of the fifth lens L5;

SAG61: sagittal height of the surface R11 of the sixth lens L6;

SAG62: sagittal height of the surface R12 of the sixth lens L6;

SD: semi-diameter parameter of the lens surface;

nd1: refractive index of the first lens L1;

nd2: refractive index of the second lens L2;

nd3: refractive index of the third lens L3;

nd4: refractive index of the fourth lens L4;

nd5: refractive index of the fifth lens L5;

nd6: refractive index of the sixth lens L6;

ndg: refractive index of the optical filter GF;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Besides, the distance from the image-side surface of the sixth lens L6 to the imaging surface Si is 1.425 mm, the TTL of the integral optical camera lens 10 is 5.331 mm, the relative aperture FNo. is 2.0 mm.

Table 3 shows aspheric surface data of each lens in the optical camera lens 10 according to an exemplary embodiment of the present disclosure.

TABLE 3

| | Cone coefficient | Aspheric surface coefficient | | | | | | |
|---|---|---|---|---|---|---|---|---|
| | k | A4 | A6 | A8 | A10 | A12 | A14 | A16 |
| R1 | 1.4735E−01 | 0.00449467 | −0.01175946 | 0.014645068 | −0.01408059 | 0.005646024 | 0.000739769 | −0.00194038 |
| R2 | −5.8526E+01 | −0.03023319 | 0.025969766 | −0.00167272 | 0.002804817 | 0.000992007 | −0.00906813 | 0.001088185 |
| R3 | 3.5185E+01 | −0.12664571 | 0.15844876 | −0.06655137 | 0.027589202 | −0.008640118 | −0.00716178 | 0.002636878 |
| R4 | −5.2843E+01 | 0.008516127 | 0.046301496 | 0.017646796 | −0.01649182 | 0.004814592 | 0.000619896 | 0.00269845 |
| R5 | 2.3208E+01 | −0.07297221 | −0.05223938 | 0.02504704 | −0.01880354 | −0.000195384 | 0.006251836 | 0.007706782 |
| R6 | −4.4383E+03 | −0.02079809 | −0.05691221 | 2.32611E−05 | 0.004842127 | 0.000885647 | 0.000181192 | 0.001303923 |
| R7 | 2.5293E+01 | −0.04274624 | −0.02849523 | 0.052798804 | −0.02306204 | 0.004638488 | 0.003596045 | −0.00188624 |
| R8 | 8.1325E+01 | −0.06757647 | −0.03004083 | 0.033854443 | −4.3846E−05 | −0.001885045 | −0.00056547 | 0.000138705 |
| R9 | −3.7473E+03 | 0.030094912 | −0.0502202 | 0.018047586 | −0.0011844 | −0.001854861 | 0.000704392 | −7.596E−05 |
| R10 | −2.4838E+00 | 0.056671009 | −0.023145 | 0.007262627 | −0.00150785 | 0.000256649 | −4.2831E−05 | 3.08917E−06 |
| R11 | −6.7543E+01 | −0.09421001 | 0.026009024 | −0.00203783 | −3.4291E−05 | 1.97645E−06 | 2.21286E−07 | 3.91127E−08 |
| R12 | −1.4795E+01 | −0.04659585 | 0.010497319 | −0.00173895 | 0.000147694 | −4.36162E−06 | −5.6326E−08 | 1.07275E−09 |

Table 4 and Table 5 show the design data of inflection point and stationary point of each lens in the optical camera lens 10 according to an exemplary embodiment of the present disclosure. R1, R2 respectively represent the object-side surface and the image-side surface of the first lens L1; R3, R4 respectively represent the object-side surface and the image-side surface of the second lens L2; R5, R6 respectively represent the object-side surface and the image-side surface of the third lens L3; R7, R8 respectively represent the object-side surface and the image-side surface of the fourth lens L4; R9, R10 respectively represent the object-side surface and the image-side surface of the fifth lens L5; R11, R12 respectively represent the object-side surface and the image-side surface of the sixth lens L6. The data corresponding to the 'position of inflection point' column is the vertical distance from the inflection point arranged by each lens surface to the optical axis of the optical camera lens 10. The data corresponding to the 'position of stationary point' column is the vertical distance from the stationary point arranged by each lens surface to the optical axis of the optical camera lens 10.

TABLE 4

| | Number of inflection point | Position 1 of the inflection point | Position 2 of the inflection point | Position 3 of the inflection point |
|---|---|---|---|---|
| R1 | 1 | 1.125 | | |
| R2 | 1 | 0.885 | | |
| R3 | 3 | 0.355 | 0.505 | 1.075 |
| R4 | 0 | | | |
| R5 | 2 | 0.355 | 0.985 | |
| R6 | 2 | 0.245 | 1.115 | |
| R7 | 1 | 1.235 | | |
| R8 | 2 | 1.075 | 1.385 | |
| R9 | 3 | 0.565 | 1.695 | 1.875 |
| R10 | 2 | 1.065 | 1.665 | |
| R11 | 3 | 1.485 | 2.195 | 2.615 |
| R12 | 1 | 0.605 | | |

TABLE 5

| | Number of the stationary point | Position 1 of the stationary point | Position 2 of the stationary point |
|---|---|---|---|
| R1 | 0 | | |
| R2 | 1 | 1.055 | |
| R3 | 0 | | |
| R4 | 0 | | |
| R5 | 2 | 0.585 | 1.095 |
| R6 | 1 | 0.395 | |
| R7 | 0 | | |
| R8 | 0 | | |
| R9 | 1 | 0.835 | |
| R10 | 0 | | |
| R11 | 0 | | |
| R12 | 1 | 1.275 | |

Figure 2:
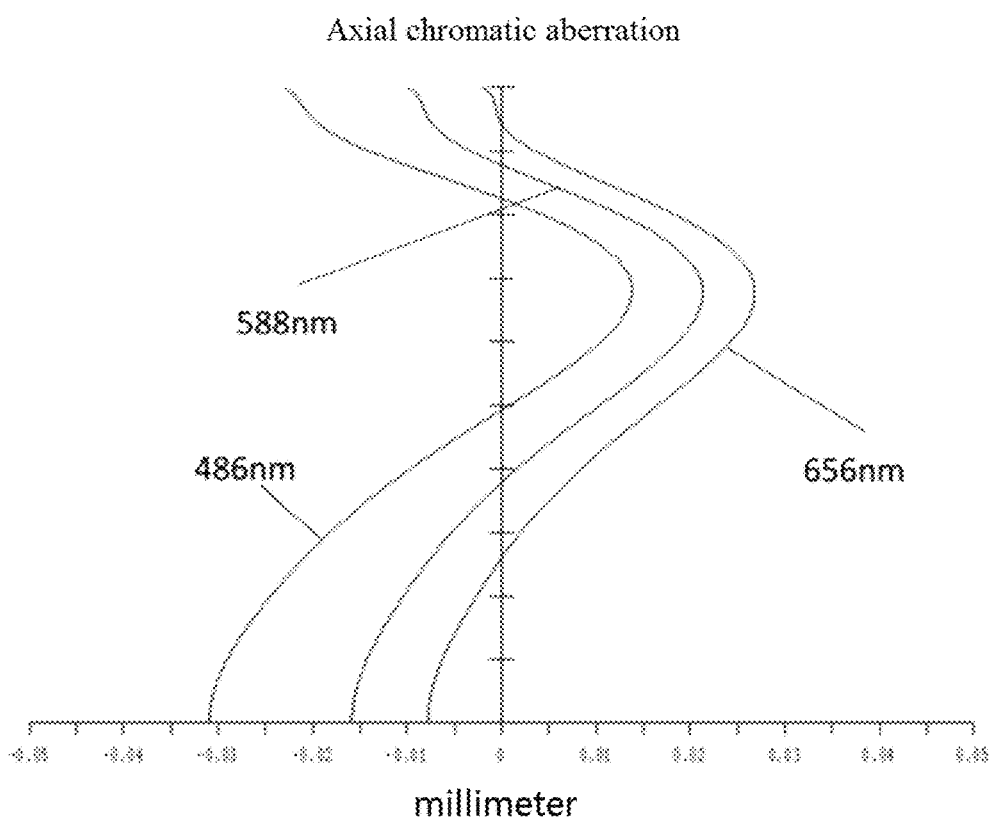
FIG. 2 is a schematic diagram of axial chromatic aberration of an optical camera lens shown in FIG. 1.
Figure 3:
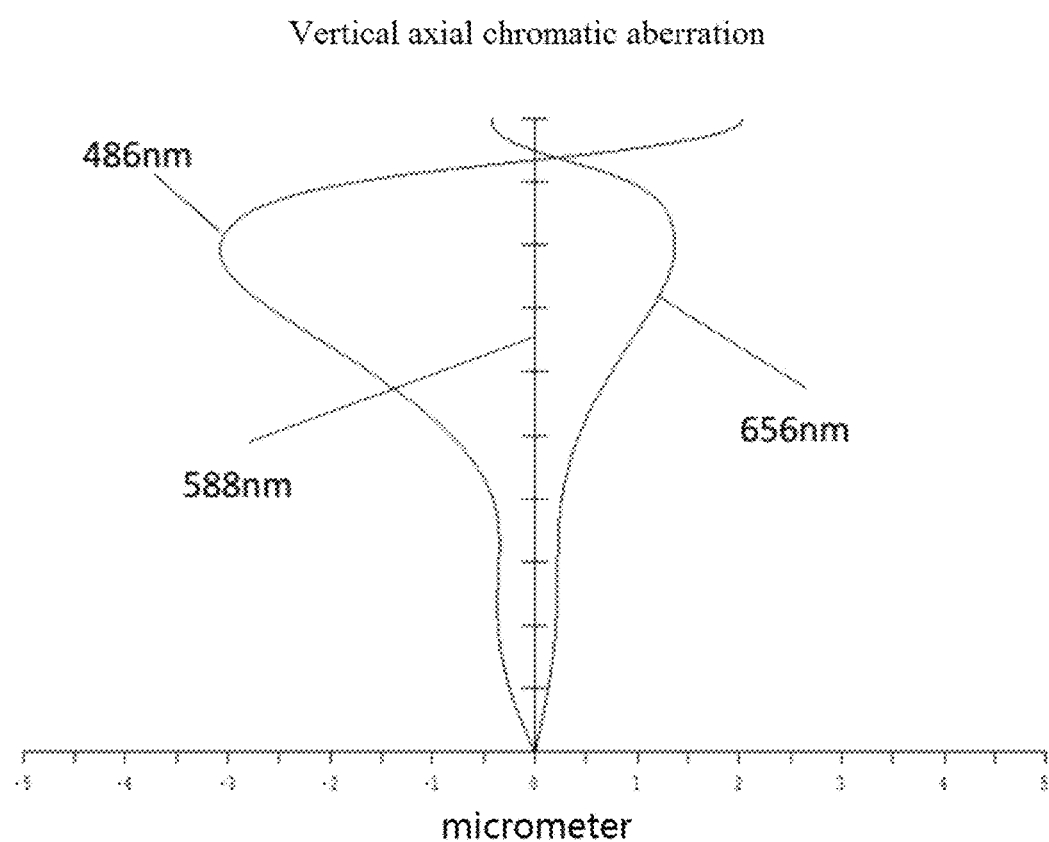
FIG. 3 is a schematic diagram of vertical axial chromatic aberration of an optical camera lens shown in FIG. 1.
Figure 4:
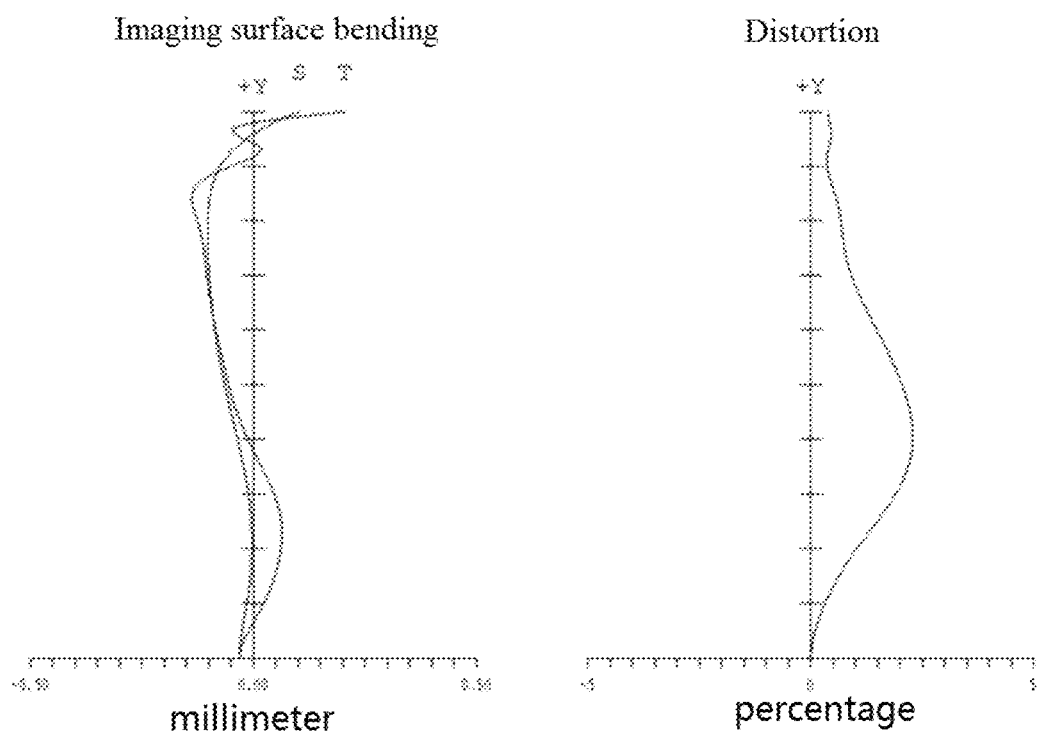
FIG. 4 is a schematic diagram of imaging surface bending and distortion of an optical camera lens shown in FIG. 1.

FIG. 2 and FIG. 3 respectively show the schematic diagram of the axial chromatic aberration and ratio chromatic aberration of the optical camera lens 10 according to an exemplary embodiment after light with a respective wave length of 486 nm, 588 nm and 656 nm passing through the optical camera lens 10. FIG. 4 shows the schematic diagram of the astigmatism field curvature and distortion of the optical camera lens 10 according to an exemplary embodiment after light with a wave length of 588 nm passing through the optical camera lens 10.

The following table 6 lists values with respect to each conditional expression in the present embodiment according to the above conditional expressions. Obviously, the optical camera system of the present embodiment satisfies the above conditional expressions.

TABLE 6

| Conditions | Embodiment |
|---|---|
| −0.7 < r3/r8 < −0.5 | −0.513 |
| TTL/IH < 1.35 | 1.274 |
| 1.24 < (r9 − r10)/(r9 + r10) < 1.4 | 1.242 |
| 1.5 < |(f2 + f4)/f3| < 2.4 | 1.520 |
| −3.5 < f2/f < −2.5 | −3.036 |

Figure 5:
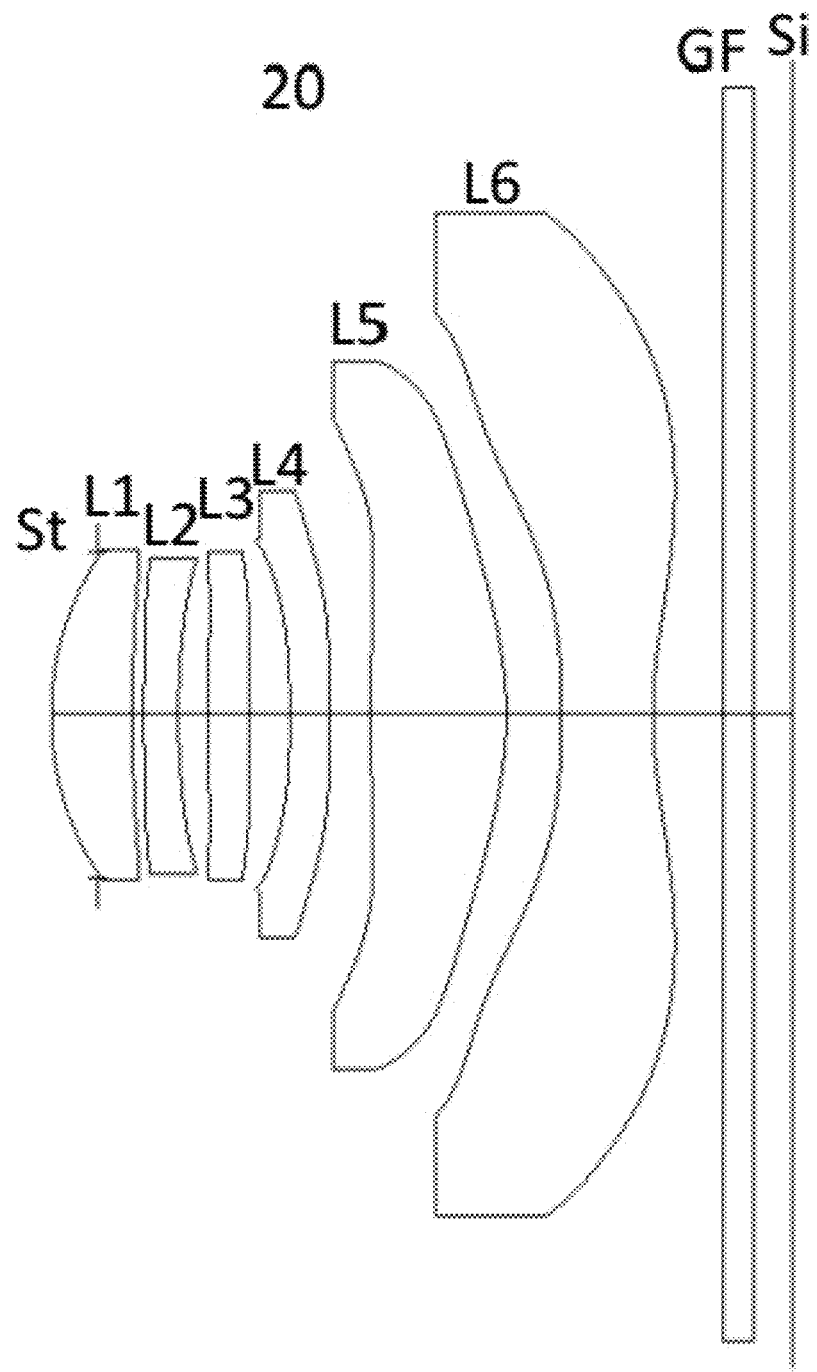
FIG. 5 is a structural schematic diagram of an optical camera lens according to another exemplary embodiment of the present disclosure.

In the present embodiment, the image height of full field of view of the optical camera lens is 3.936 mm, the field of view angle in the diagonal direction is 85.81°. The design data of the optical camera lens 20 according to FIG. 5 and Embodiment 2 of the present disclosure is shown as follows.

Table 7 and Table 8 show data of the lens in the optical camera lens 20 according to an exemplary embodiment of the present disclosure.

TABLE 7

| Focal length (mm) | |
|---|---|
| f | 4.179909 |
| f1 | 4.192365 |
| f2 | −10.5733 |
| f3 | 12.04495 |
| f4 | −15.3937 |
| f5 | 3.419095 |
| f6 | −2.87945 |
| f12 | 6.1449 |

In which, meaning of each symbol is as follows.
f: focal length of the optical camera lens 10;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
f12: combined focal length of the first lens L1 and the second lens L2.

TABLE 8

| | | Curvature radius (R) (mm) | Thickness/ Distance (d) (mm) | | Sagittal height (SAG) (mm) | Semi-diameter (SD) (mm) | Refractive index (nd) | Abbe number (vd) |
|---|---|---|---|---|---|---|---|---|
| St | St | ∞ | d0 = | −0.327 | | | | |
| L1 | R1 | 1.74183 | d1 = | 0.574 | SAG11 0.364 | 1.069 | nd1 1.5449 | v1 55.93 |
| | R2 | 6.47967 | d2 = | 0.086 | SAG12 0.055 | 1.027 | | |
| L2 | R3 | 9.52346 | d3 = | 0.245 | SAG21 0.044 | 1.024 | nd2 1.6510 | v2 21.51 |
| | R4 | 3.95472 | d4 = | 0.207 | SAG22 0.130 | 1.014 | | |

TABLE 8-continued

|    |     | Curvature radius (R) (mm) | Thickness/ Distance (d) (mm) | | Sagittal height (SAG) (mm) | | Semi-diameter (SD) (mm) | Refractive index (nd) | | Abbe number (vd) | |
|----|-----|---------|---------|-------|-------|--------|-------|------|--------|-----|-------|
| L3 | R5  | 7.05909 | d5 =  | 0.305 | SAG31 | 0.005  | 1.030 | nd3  | 1.5449 | v3  | 55.93 |
|    | R6  | −92.07130 | d6 = | 0.284 | SAG32 | −0.049 | 1.067 |      |        |     |       |
| L4 | R7  | −5.96595 | d7 = | 0.287 | SAG41 | −0.220 | 1.149 | nd4  | 1.6510 | v4  | 21.51 |
|    | R8  | −15.02329 | d8 = | 0.291 | SAG42 | −0.259 | 1.453 |      |        |     |       |
| L5 | R9  | 14.06554 | d9 = | 0.952 | SAG51 | −0.268 | 1.936 | nd5  | 1.5449 | v5  | 55.93 |
|    | R10 | −2.09634 | d10 = | 0.398 | SAG52 | −0.911 | 2.310 |      |        |     |       |
| L6 | R11 | −4.5528 | d11 = | 0.650 | SAG61 | −0.905 | 2.622 | nd6  | 1.5449 | v6  | 55.93 |
|    | R12 | 2.514851 | d12 = | 0.507 | SAG62 | −0.772 | 3.279 |      |        |     |       |
| GF | R13 | ∞       | d13 = | 0.210 |       |        |       | ndg  | 1.5168 | vg  | 64.17 |
|    | R14 | ∞       | d14 = | 0.284 |       |        |       |      |        |     |       |

In which, R1, R2 are the object-side surface and the image-side surface of the first lens L1, respectively; R3, R4 are the object-side surface and the image-side surface of the second lens L2, respectively; R5, R6 are the object-side surface and the image-side surface of the third lens L3, respectively; R7, R8 are the object-side surface and the image-side surface of the fourth lens L4, respectively; R9, R10 are the object-side surface and the image-side surface of the fifth lens L5, respectively; R11, R12 are the object-side surface and the image-side surface of the sixth lens L6, respectively; R13, R14 are the object-side surface and the image-side surface of the optical filter GF, respectively. Meanings of other symbols are as follows.

d0: axial distance from the aperture St to the object-side surface of the first lens L1;

d1: axial thickness of the first lens L1;

d2: axial distance from the image-side surface of the first lens L1 to the object-side surface of the second lens L2;

d3: axial thickness of the second lens L2;

d4: axial distance from the image-side surface of the second lens L2 to the object-side surface of the third lens L3;

d5: axial thickness of the third lens L3;

d6: axial distance from the image-side surface of the third lens L3 to the object-side surface of the fourth lens L4;

d7: axial thickness of the fourth lens L4;

d8: axial distance from the image-side surface of the fourth lens L4 to the object-side surface of the fifth lens L5;

d9: axial thickness of the fifth lens L5;

d10: axial distance from the image-side surface of the fifth lens L5 to the object-side surface of the sixth lens L6;

d11: axial thickness of the sixth lens L6;

d12: axial distance from the image-side surface of the sixth lens L6 to the object-side surface of the optical filter GF;

d13: axial thickness of the optical filter GF;

d14: axial distance from the image-side surface of the optical filter GF to the imaging surface;

SAG: sagittal height, vertical distance between topmost point and bottommost point of the lens;

SAG11: sagittal height of the surface R1 of the first lens L1;

SAG12: sagittal height of the surface R2 of the first lens L1;

SAG21: sagittal height of the surface R3 of the second lens L2;

SAG22: sagittal height of the surface R4 of the second lens L2;

SAG31: sagittal height of the surface R5 of the third lens L3;

SAG32: sagittal height of the surface R6 of the third lens L3;

SAG41: sagittal height of the surface R7 of the fourth lens L4;

SAG42: sagittal height of the surface R8 of the fourth lens L4;

SAG51: sagittal height of the surface R9 of the fifth lens L5;

SAG52: sagittal height of the surface R10 of the fifth lens L5;

SAG61: sagittal height of the surface R11 of the sixth lens L6;

SAG62: sagittal height of the surface R12 of the sixth lens L6;

SD: semi-diameter parameter of the lens surface;

nd1: refractive index of the first lens L1;

nd2: refractive index of the second lens L2;

nd3: refractive index of the third lens L3;

nd4: refractive index of the fourth lens L4;

nd5: refractive index of the fifth lens L5;

nd6: refractive index of the sixth lens L6;

ndg: refractive index of the optical filter GF;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Besides, the distance from the image-side surface of the sixth lens L6 to the imaging surface Si is 1.001 mm, the TTL of the integral optical camera lens 10 is 5.281 mm, the relative aperture FNo. is 2.0 mm.

Table 9 shows aspheric surface data of each lens in the optical camera lens 20 according to an exemplary embodiment of the present disclosure.

TABLE 9

| | Cone coefficient | Aspheric surface coefficient | | | | | | |
|---|---|---|---|---|---|---|---|---|
| | k | A4 | A6 | A8 | A10 | A12 | A14 | A16 |
| R1 | 1.0612E−01 | 0.001645319 | −0.01047004 | 0.014216146 | −0.01528396 | 0.006176578 | 0.000759937 | −0.0018186 |
| R2 | −7.8978E+01 | −0.02887141 | 0.03055273 | 0.000200281 | 0.002037707 | −0.001137399 | −0.01011535 | 0.003116414 |
| R3 | 4.2131E+01 | −0.11669711 | 0.15596247 | −0.07031946 | 0.027587788 | −0.010192449 | −0.00799867 | 0.002090654 |
| R4 | −4.0919E+01 | −0.00116558 | 0.041516861 | 0.017221769 | −0.01487404 | 0.001132413 | −0.00874957 | 0.002734938 |
| R5 | 2.5642E+01 | −0.06934566 | −0.04561725 | 0.032441577 | −0.01075952 | 0.008607585 | 0.010393811 | −0.00463661 |
| R6 | −2.5134E+05 | −0.02236365 | −0.04653287 | 0.010131376 | 0.011375416 | 0.002781989 | 1.02E−05 | 0.001804147 |
| R7 | 2.6093E+01 | −0.05495011 | −0.03145123 | 0.053886686 | −0.02034453 | 0.006765377 | 0.003939226 | −0.00398635 |
| R8 | 1.0117E+02 | −0.06678605 | −0.02929206 | 0.033849869 | −2.00E−04 | −0.001993095 | −0.00061007 | 0.000144955 |
| R9 | −5.8605E+02 | 0.028057776 | −0.04893724 | 0.018033001 | −0.00118836 | −0.001873495 | 0.000700008 | −7.46E−05 |
| R10 | −3.7654E+00 | 0.047399637 | −0.02462349 | 0.007289678 | −0.00146789 | 0.000267496 | −4.21E−05 | 2.67E−06 |
| R11 | −3.9499E+01 | −0.09276835 | 0.025868946 | −0.00206262 | −3.64E−05 | 2.14E−06 | 2.69E−07 | 2.80E−08 |
| R12 | −1.0080E+01 | −0.04391073 | 0.010595885 | −0.00174998 | 0.000146285 | −4.50E−06 | −5.43E−08 | 2.85E−09 |

Table 10 and Table 11 show the design data of inflection point and stationary point of each lens in the optical camera lens 20 according to Embodiment 2 of the present disclosure. R1, R2 respectively represent the object-side surface and the image-side surface of the first lens L1; R3, R4 respectively represent the object-side surface and the image-side surface of the second lens L2; R5, R6 respectively represent the object-side surface and the image-side surface of the third lens L3; R7, R8 respectively represent the object-side surface and the image-side surface of the fourth lens L4; R9, R10 respectively represent the object-side surface and the image-side surface of the fifth lens L5; R11, R12 respectively represent the object-side surface and the image-side surface of the sixth lens L6. The data corresponding to the 'position of inflection point' column is the vertical distance from the inflection point disposed on each lens surface to the optical axis of the optical camera lens 20. The data corresponding to the 'position of stationary point' column is the vertical distance from the stationary point disposed on each lens surface to the optical axis of the optical camera lens 20.

TABLE 10

| | Number of inflection point | Position 1 of the inflection point | Position 2 of the inflection point | Position 3 of the inflection point |
|---|---|---|---|---|
| R1 | 0 | | | |
| R2 | 1 | 0.925 | | |
| R3 | 3 | 0.395 | 0.445 | 0.985 |
| R4 | 0 | | | |
| R5 | 2 | 0.405 | 0.905 | |
| R6 | 1 | 0.935 | | |
| R7 | 0 | | | |
| R8 | 2 | 1.125 | 1.265 | |
| R9 | 3 | 0.605 | 1.725 | 1.855 |
| R10 | 0 | | | |
| R11 | 2 | 1.485 | 2.125 | |
| R12 | 1 | 0.685 | | |

TABLE 11

| | Number of the stationary point | Position 1 of the stationary point | Position 2 of the stationary point |
|---|---|---|---|
| R1 | 0 | | |
| R2 | 0 | | |
| R3 | 0 | | |
| R4 | 0 | | |
| R5 | 2 | 0.685 | 1.015 |

TABLE 11-continued

| | Number of the stationary point | Position 1 of the stationary point | Position 2 of the stationary point |
|---|---|---|---|
| R6 | 0 | | |
| R7 | 0 | | |
| R8 | 0 | | |
| R9 | 1 | 0.915 | |
| R10 | 0 | | |
| R11 | 0 | | |
| R12 | 1 | 1.475 | |

Figure 6:
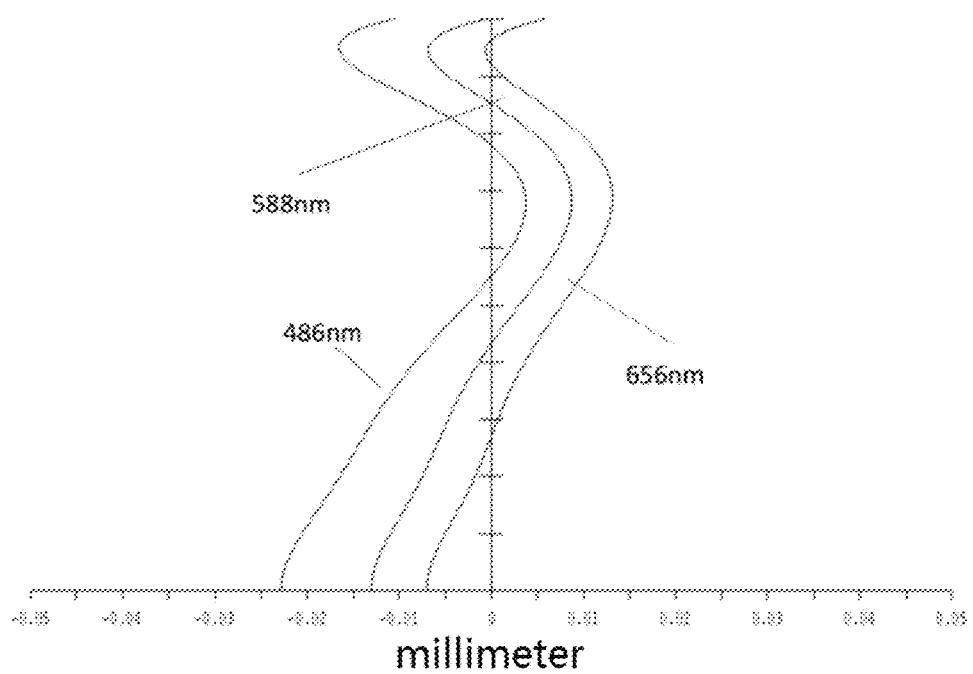
FIG. 6 is a schematic diagram of axial chromatic aberration of an optical camera lens shown in FIG. 5.
Figure 7:
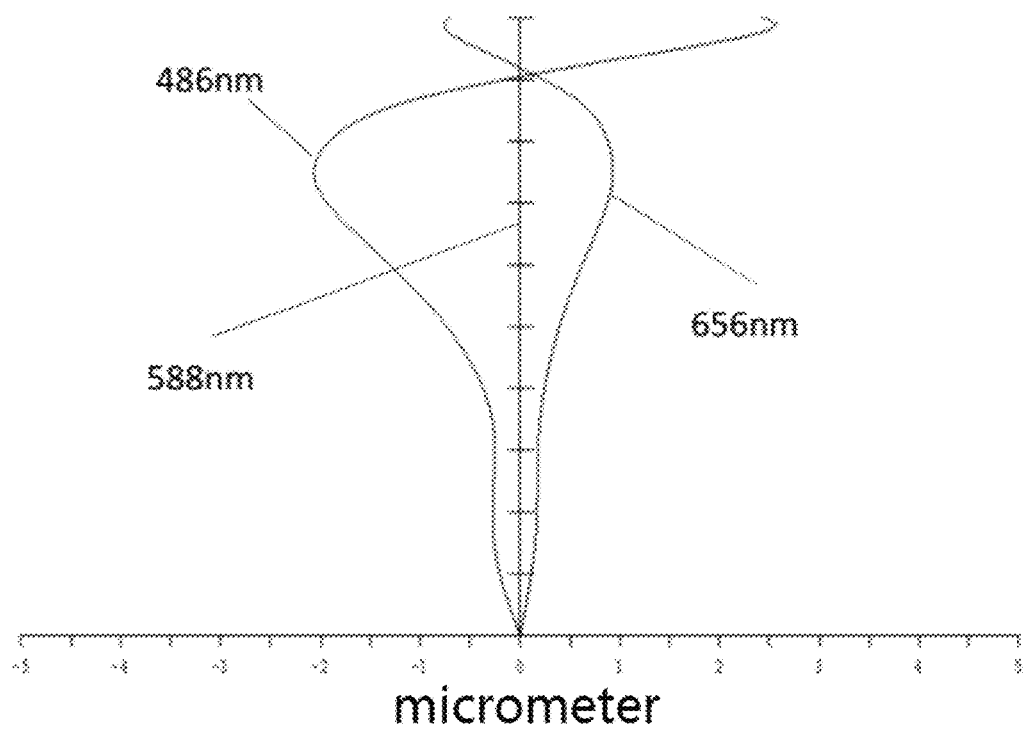
FIG. 7 is a schematic diagram of vertical axial chromatic aberration of an optical camera lens shown in FIG. 5.
Figure 8:
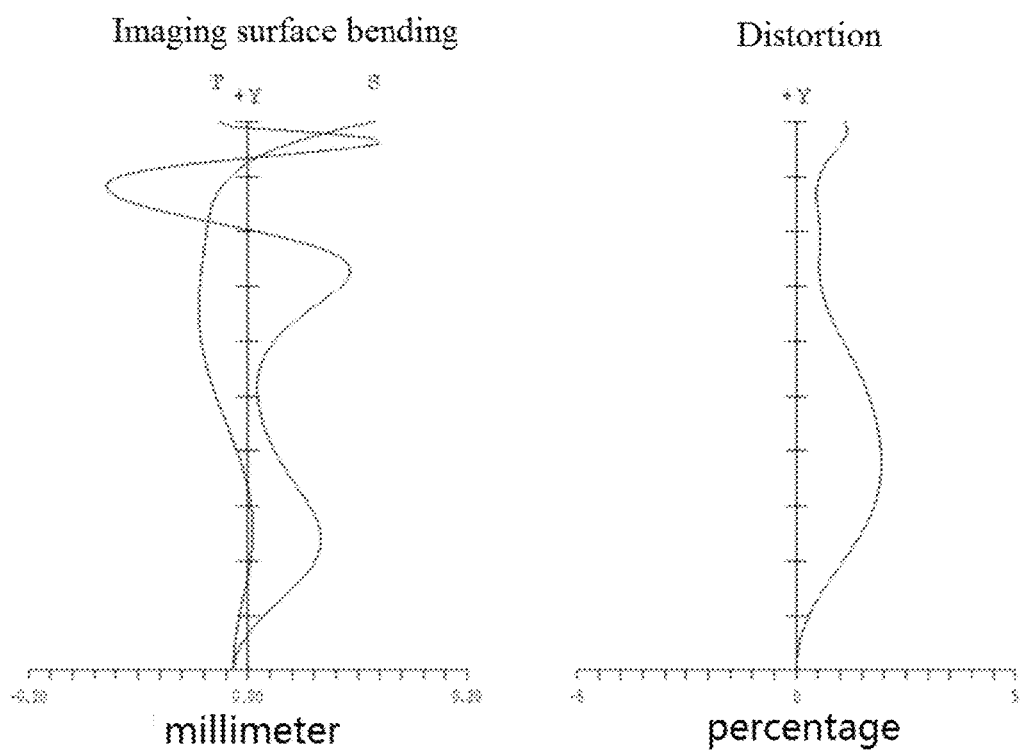
FIG. 8 is a schematic diagram of imaging surface bending and distortion of an optical camera lens shown in FIG. 5.

FIG. 6 and FIG. 7 respectively show the schematic diagram of the axial chromatic aberration and ratio chromatic aberration of the optical camera lens 20 according to Embodiment 2 after light with a respective wave length of 486 nm, 588 nm and 656 nm passing through the optical camera lens 10. FIG. 8 shows the schematic diagram of the astigmatism field curvature and distortion of the optical camera lens 20 according to an exemplary embodiment after light with a wave length of 588 nm passing through the optical camera lens 10.

The following table 12 lists values with respect to each conditional expression in the present embodiment according to the above conditional expressions. Obviously, the optical camera system of the present embodiment satisfies the above conditional expressions.

TABLE 12

| Conditions | Embodiment 2 |
|---|---|
| −0.7 < r3/r8 < −0.5 | −0.634 |
| TTL/IH < 1.35 | 1.262 |
| 1.24 < (r9 − r10)/(r9 + r10) < 1.4 | 1.350 |
| 1.5 < |(f2 + f4)/f3| < 2.4 | 2.156 |
| −3.5 < f2/f < −2.5 | −2.530 |

In the present embodiment, the image height of full field of view of the optical camera lens is 3.936 mm, the field of view angle in the diagonal direction is 86.56°

Person skilled in the art shall understand, the above implementing manners are detailed embodiments of the present disclosure, however, in practical application, various modifications may be made to the forms and details thereof, without departing from the spirit and scope of the present disclosure.

What is claimed is:
1. An optical camera lens, from an object side to an image side, successively comprising:

an aperture;
a first lens having positive refraction power;
a second lens having negative refraction power;
a third lens having positive refraction power;
a fourth lens having negative refraction power;
a fifth lens having positive refraction power; and
a sixth lens having negative refraction power;
wherein a curvature radius of an object-side surface of the second lens is r3, a curvature radius of an image-side surface of the fourth lens is r8, a total track length of the optical camera lens is TTL, an image height of the optical camera lens is IH, a curvature radius of an object-side surface of the fifth lens is r9, a curvature radius of an image-side surface of the fifth lens is r10, a focal length of the integral optical camera lens is f, a focal length of the second lens is f2, a focal length of the third lens is f3, a focal length of the fourth lens is f4, which satisfy the following relational expressions:

$-0.7 < r3/r8 < -0.5$;

$TTL/IH < 1.35$;

$1.24 < (r9-r10)/(r9+r10) < 1.4$;

$1.5 < |(f2+f4)/f3| < 2.4$;

$-3.5 < f2/f < -2.5$.

2. The optical camera lens as described in claim 1, wherein a focal length f1 of the first lens, the focal length f2 of the second lens, the focal length f3 of the third lens, the focal length f4 of the fourth lens, a focal length f5 of the fifth lens and a focal length f6 of the sixth lens satisfy following relational expressions, respectively:

$4 < f1 < 5$;

$-15 < f2 < -10$;

$10 < f3 < 20$;

$-18 < f4 < -12$;

$-4 < f5 < -2$;

$-3 < f6 < -2$.

3. The optical camera lens as described in claim 1, wherein a refractive index n1 of the first lens, a refractive index n2 of the second lens, a refractive index n3 of the third lens, a refractive index n4 of the fourth lens, a refractive index n5 of the fifth lens and a refractive index n6 of the sixth lens satisfy following relational expressions, respectively:

$1.50 < n1 < 1.55$;

$1.60 < n2 < 1.70$;

$1.50 < n3 < 1.55$;

$1.60 < n4 < 1.70$;

$1.50 < n5 < 1.55$;

$1.50 < n6 < 1.55$.

4. The optical camera lens as described in claim 1, wherein an abbe number v1 of the first lens, an abbe number v2 of the second lens, an abbe number v3 of the third lens, an abbe number v4 of the fourth lens, an abbe number v5 of the fifth lens and an abbe number v6 of the sixth lens satisfy following relational expressions, respectively:

$40 < v1 < 60$;

$15 < v2 < 30$;

$40 < v3 < 60$;

$15 < v4 < 30$;

$40 < v5 < 60$;

$40 < v6 < 60$.

* * * * *